Figure 1:
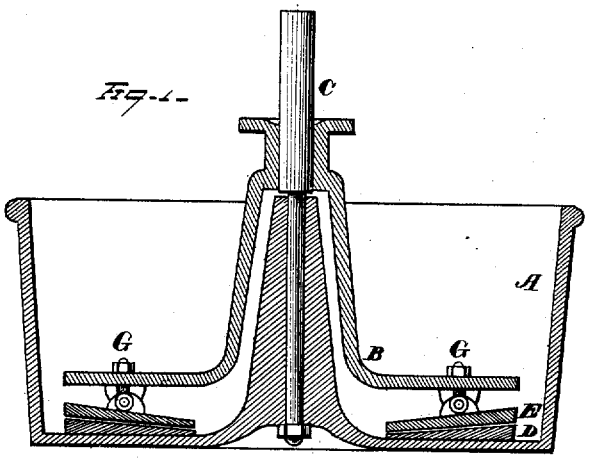

C. CUMMINGS.

GRINDING AND AMALGAMATING PAN.

No. 7,092. Reissued May 2, 1876.

WITNESSES

E. F. Rothwehaue

Albert H. Bright

INVENTOR

Charles Cummings.

By H. A. Seymour.

Attorney

N. PETERS, PHOTO-LITHOGRAPHER, WASHINGTON, D. C.

UNITED STATES PATENT OFFICE.

CHARLES CUMMINGS, OF VIRGINIA CITY, NEVADA.

IMPROVEMENT IN GRINDING AND AMALGAMATING PANS.

Specification forming part of Letters Patent No. 168,621, dated October 11, 1875; reissue No. 7,092, dated May 2, 1876; application filed April 7, 1876.

*To all whom it may concern:*

Be it known that I, C. CUMMINGS, of Virginia City, in the county of Storey and State of Nevada, have invented certain new and useful Improvements in Amalgamators; and I do hereby declare the following to be a full, clear, and exact description of the invention, such as will enable others skilled in the art to which it pertains to make and use it, reference being had to the accompanying drawings, which form part of this specification.

My invention relates to an improvement in amalgamators. Heretofore the shoes in amalgamators have been constructed of uniform thickness throughout, and as the shoes are rapidly rotated the outer portion of the same, traveling at a much higher rate of speed than their inner portions, will be rapidly worn away, thereby soon rendering useless the entire shoe. Again, the shoes in amalgamators are ordinarily rigidly secured to the muller, and the partially-pulverized ore passes between the plates, and is thoroughly pulverized by the rotary motion of the muller carrying the shoes. Owing to the rigidity of the plates and the consequent greater wear at their periphery, the plates are not in close contact throughout their entire surface, but gradually separate from the point of lesser motion to that of the greatest motion, thus making it necessary to run the muller very fast in order to obtain sufficient velocity of the plates at their point of closest contact or least motion to produce the proper grinding effect, whereby a great deal of power is wasted in running the muller and shoes through the thick and heavy pulp. The object of my invention is to so construct the grinding-plates that the greater portion of the grinding will be done at the periphery, or where the motion is greatest. I can run the muller slower and still have the requisite velocity for grinding, and thus save the loss of power above referred to. To do this I pivot the shoe, as shown in the drawing, so as to allow it to adjust itself as it wears away, and keep it in contact with the die at the periphery, so as to produce the proper grinding effect at that point. The pivot or joint on which the shoe hinges I place as low down in the shoe as is practical, so as to neutralize as nearly as possible the centrifugal force, which has a tendency to depress the shoe at the point of least motion.

In one instance the shoes have been hinged to the muller; but the construction was such that pins or guides were necessary to impart additional strength to the shoes in order to restrain the centrifugal force.

The object of my invention is to obviate the defects above set forth; and to that end my invention consists, first, in the combination, with the dies of an amalgamator, of tapering or wedge-shaped shoes and dies; second, in a hinge-joint located between the muller and shoes of an amalgamator, and serving to connect the shoes to the muller in a self-adjustable manner; third, in the shoes of an amalgamator, provided with extended hinge-joints and bolts, whereby they may be securely attached to the muller; fourth, in certain details of construction, as hereinafter specified and claimed.

Figure 2:
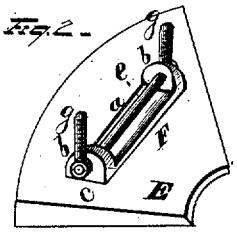
Figure 3:
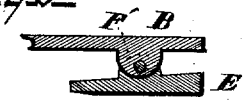

In the drawings, Figure 1 represents a vertical section of my invention, and Fig. 2 is a perspective view of one of the shoes detached from the muller. Fig. 3 is a cross-section of the shoe and muller, showing the hinge-joint.

A represents a grinding or amalgamating pan, and B the muller, suitably journaled to a central post or standard, C. The dies D are rigidly secured in any desired manner to the bottom of the amalgamating-pan, and upon said dies the shoes E are rotated by means of the muller B, a rotary movement being imparted thereto by any suitable machinery or motive power. As heretofore stated, the outer portions of the shoes employed in amalgamators wear away much faster than their inner portions; and to provide for such variable wear I construct the shoes E tapering or wedge-shaped, as shown, and attach them to the muller so that their thicker portion shall rest in contact with the outer portion of the dies D. By constructing the shoes of the shape specified the grinding-surface between the outer portions of the shoes and dies is preserved, and thereby necessitates the expenditure of only a minimum amount of power. Again, by increasing the thickness of the outer edges of the shoe to compensate for the additional wear caused by the outer portion of the shoe traveling over greater surface than its inner portion, the shoe will wear for a much greater length of time than those of uniform thickness, and consequently obviate the expense incurred in stopping the pan to replace worn-out shoes and dies.

An extended hinge-joint or bearing, F, is cast solid with the shoe E, said joint having a convex bearing, *a*, upon which rests the concave face of a rib, F′, cast upon the lower side of the muller B. Bearing F is provided with ears or lugs *b*, perforated for the reception of a bolt or shaft, *e*, which passes through an opening formed in the rib F. Upon the ends of the bolt *e* the screw-threaded eyebolts *g* are secured, whereby the shoes are attached to the muller by the nuts G. The hinge-joint allows the shoes to vibrate or move freely on the same, whereby they can adapt themselves to any irregularities of the dies or wearing-surface, and thus maintain an even and uniform bearing at all times, and at all stages of wear.

The hinge-joint, having an extended bearing at right angles to the direction of the greatest resistance, is sufficient in itself to withstand any force that may be exerted on the same without affecting the free working of the hinge. Although shoes and dies of uniform thickness can be used with this method of attachment, I gain a very great advantage in their durability by making them thicker toward and at their outer edges.

Having fully described my invention, what I claim as new, and desire to secure by Letters Patent, is—

1. In an amalgamator, the combination, with the muller and dies, of tapering shoes E, substantially as and for the purpose specified.

2. In an amalgamator, the combination, with the muller and shoes, of a hinged joint located between the same, and serving to connect the shoes to the muller in a self-adjustable manner, substantially as and for the purpose specified.

3. The combination, with the shoes of an amalgamator, of an extended hinged joint, provided with bolts for securing the same to the muller, substantially as and for the purpose set forth.

4. The combination, with the muller, of the shoe E, provided with the plate *a*, provided with ears *b*, shaft *e*, and threaded eye bolts *g*, substantially as and for the purpose specified.

In testimony that I claim the foregoing I have hereunto set my hand this 6th day of April, 1876.

CHARLES CUMMINGS.

Witnesses:
F. O. McCleary,
E. I. Nottingham.